Nov. 14, 1944.   J. F. SCHWAN ET AL   2,362,671
VALVE
Filed Oct. 27, 1941   2 Sheets-Sheet 1

Inventors
JOSEPH F. SCHWAN
CHARLES F. PIERSON
Carlsen & Hazle
Attorneys

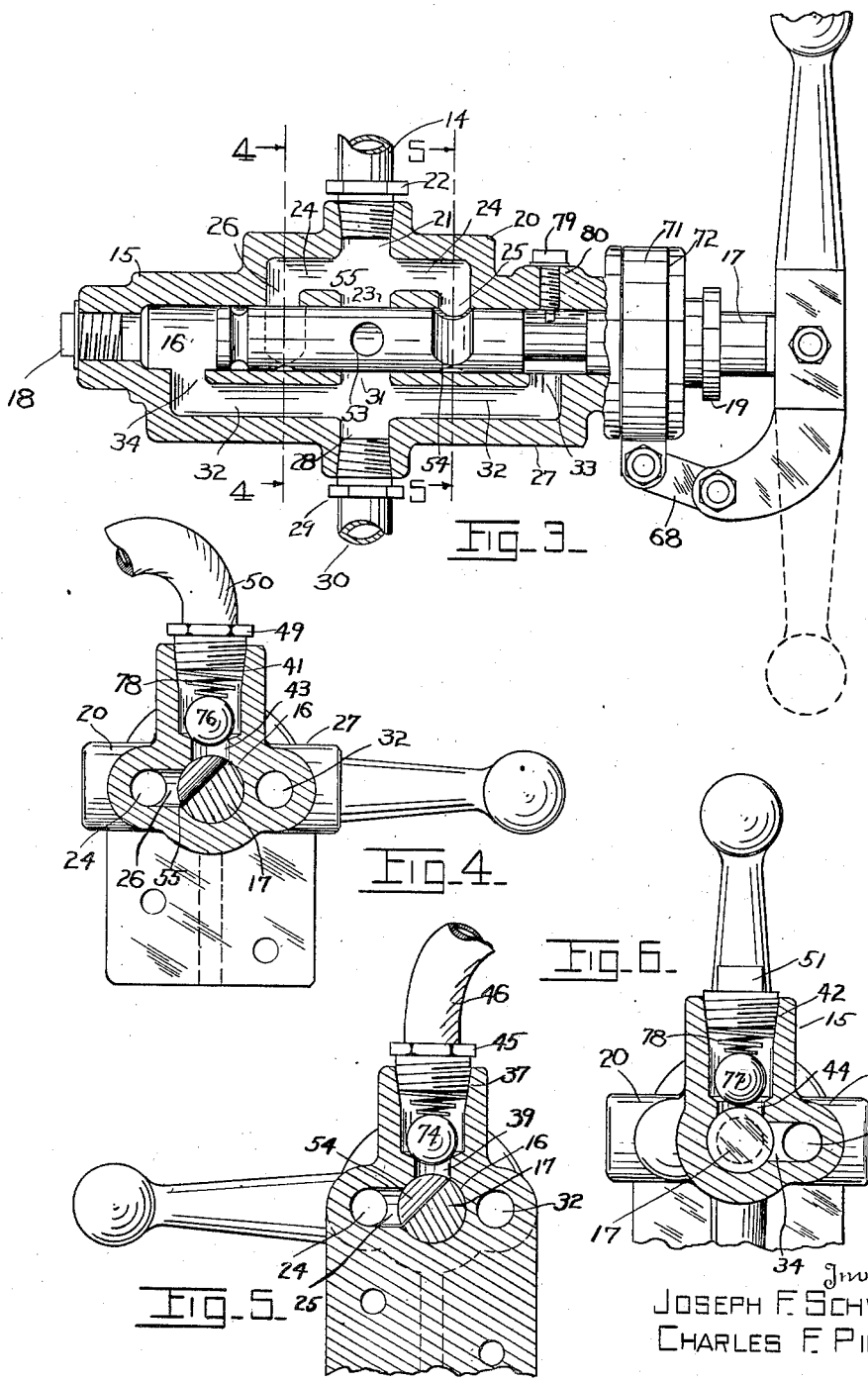

Patented Nov. 14, 1944

2,362,671

UNITED STATES PATENT OFFICE 2,362,671

VALVE

Joseph F. Schwan, St. Paul, and Charles F. Pierson, Long Lake, Minn.

Application October 27, 1941, Serial No. 416,644

10 Claims. (Cl. 277—7)

This invention relates generally to improvements in control valves and more specifically to a valve for controlling the flow of fluid from a supply source to more than one hydraulically operating work device and return.

The invention has chiefly in mind the provision of a valve with a single control member for controlling the flow of fluid to and from the several hydraulic cylinders used as operating elements in a hay loader and stacker forming the subject matter of an application for United States patent filed July 19, 1940, Serial No. 346,353, now Patent No. 2,295,917, issued Sept. 15, 1942, and in which one of the co-inventors herein, Joseph F. Schwan, is sole inventor. In that application a valve assembly for the purpose was disclosed but required the use of two operating handles or levers.

It is the primary object of this invention to provide a valve in a single unit and employing only a single handle or lever for controlling the fluid flow to the several hydraulic cylinders to thus render the manipulation as simple as possible and generally to facilitate the operation. Another object is to provide a valve of this nature in an extremely simple, durable and inexpensive form.

These and other more detailed and specific objects will be disclosed in the course of the following specification, reference being had to the accompanying drawings, in which—

Fig. 3 is an axial and horizontal section through the valve showing the valve in position for admitting fluid to one of the work cylinders and with the control lever position for admitting fluid to another work cylinder indicated in dotted lines.

Fig. 4 is a cross section along the line 4—4 in Fig. 3.

Fig. 5 is a cross section along the line 5—5 in Fig. 3.

Fig. 6 is a cross section along the line 6—6 in Fig. 2.

Figure 1:
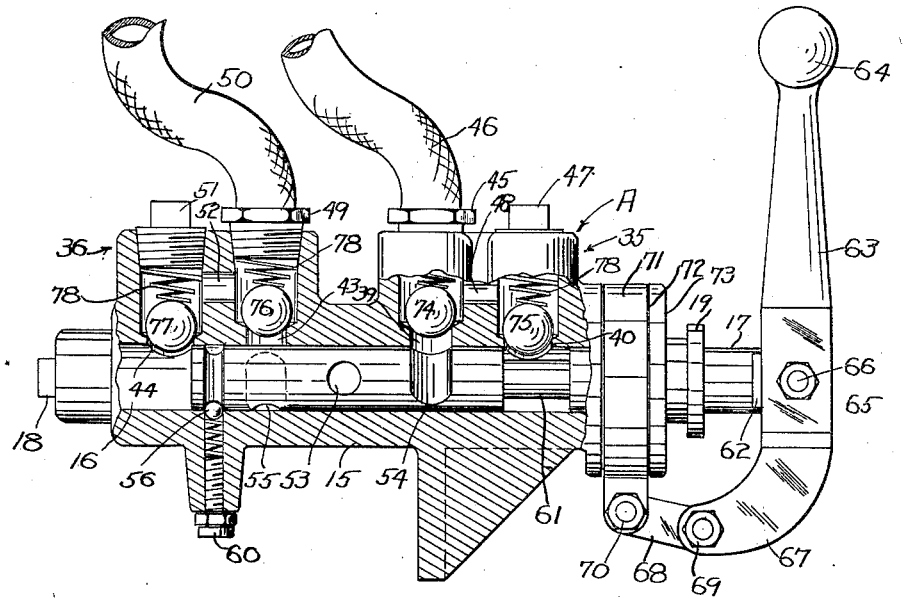
Fig. 1 is an axial and vertical section through the valve, showing the same in normal or inoperative position.

The valve comprises a housing 15 through which a bore 16 is extended from end to end to slidably and rotatably receive the valve operating plunger or rod 17. At one end the bore 16 is closed by a plug 18 and the plunger 17 extends outwardly through the other end with a conventional gland 19 provided to seal around the plunger. At one side the housing 15 has an enlargement 20 in which is provided a tapped opening 21 for receiving a coupling 22 by which the pressure or supply line 14 is connected to the valve. This opening 21 communicates with a center port 23 and branches off through ducts 24 which at their ends are extended as spaced supply ports 25 and 26. All of said ports of course communicate with the interior of the bore 16.

On the opposite side the housing 15 has an enlargement 27 in which is a tapped opening 28 to receive a coupling 29 which connects a return line 30 to the valve, said return line running back to the reservoir (not shown). Extending inwardly from opening 28 is a center exhaust port 31 and branching off therefrom are the ducts 32 terminating in spaced side exhaust ports 33 and 34. These ports likewise communicate with the bore 16 and said side ports 33 and 34 are spaced outwardly or toward the ends of the housing with respect to the side inlet ports 25 and 26 same distance as clearly shown in Fig. 3.

On the upper side of the housing two pairs of tapped openings are located in bosses 35 and 36. One pair of such openings, designated at 37 and 38, is arranged adjacent one end of the housing and the openings communicate through combination valve seats and ports 39 and 40 with the bore 16, the port 39, hereinafter termed an outlet port, being located substantially in the vertical plane of the inlet port 25 and the other port 40, termed the return port, being similarly located with respect to the exhaust port 33. The other openings, designated at 41 and 42, are located adjacent the other end of the housing and communicate with the bore 16 through similar seats and ports 43 and 44, termed outlet and return ports, and located, respectively, in the same planes as the inlet and exhaust ports 26 and 34.

In the opening 37 a coupling 45 is screwed which connects a line 46 running to one working device (not shown) to which fluid is to be supplied. In the other opening 38 a plug 47 is seated. Communication between the openings 38—39 is provided by a passage 48 so that both in effect are connected to the line 46 and hence the coupling 45 and plug 47 are interchangeable. In similar manner a coupling 49 in the opening 41 couples a line 50 running to the other working device (also not here shown) and a plug 51 closes the other opening 42. Here again the openings are connected by a passageway 52.

The valve plunger or rod 17 has near its center a diametrically extending relief port or opening 53 which in the normal or neutral position of the plunger communicates with and connects the ports 23 and 31. Spaced lengthwise along the plunger and in opposite directions from this center port 53 are two notches 54 and 55 located on opposite sides of the plunger and cut substantially to the center thereof. These notches 54 and 55 are normally located respectively, in alignment with the inlet ports 25, and 26 as best seen in Fig. 3.

The plunger 17 is releasably held in its normal position by a retaining ball 56 which engages a circumferential groove 57 near the end of the plunger, said ball being yieldably urged into such engagement by a spring 58 located in a bore 59 formed in the housing. A screw 60 in the bore not only supports this spring but enables the effective tension of the spring to be varied. Spaced from the notch 54, substantially in the plane of the exhaust port 33 the valve plunger 17 has a circumferentially extending wide and deep groove 61 which normally rests beneath the valve seat 40.

At its outer or extended end the valve plunger 17 is flattened at 62 and set astraddle this flattened end is a forked control or hand lever 63 having a knob 64 at one end. The forked end 65 of the lever is pivoted to the plunger by a cross pin or bolt 66 and said end extends below the plunger and is turned arcuately toward the valve housing, as designated at 67. A link 68 is pivoted to this curved end of the lever at 69 and at 70 is pivoted between the ends of an arcuate band 71 which rotatably encircles a groove 72 formed in an end extension 73 of the valve housing. This groove 72 being concentric with the valve plunger 17 it is obvious that the lever may be turned from side to side to rotate or oscillate the plunger on its axis, in which operation the band 71, of course, makes corresponding movements in the groove. Of course the plunger 17 may also be moved endwise in the bore 16 by swinging the lever toward or away from the housing, in which operation the lever fulcrums at its connection with the link 68.

In each of the openings 37—38 and 41—42 a check valve is arranged, said valves comprising valve balls 74—75 and 76—77 for the respective openings and which are pressed to the valve seats formed in the ports 39—40 and 43—44 by springs 78 as clearly shown. These valve balls thus normally act as checks against the return flow of fluid from the lines 46 and 50 back into the valve but attention is directed to the fact that, whereas the balls 74 and 76 are held by their seats clear of the path of the valve plunger in the bore 16, the seats for the other balls 75 and 77 are lowered or formed nearer the bore so that these balls normally will project through the ports 40 and 44 some distance into the bore 16. In the normal position of the valve plunger, however, the ball 75 hangs into the groove 61 and the ball 77 clears the plunger end so that both seal tightly at their seats 40 and 44.

As stated heretofore the valve plunger 17 in its normal position stands, as shown in Fig. 1 with the ball 56 in engagement with the groove 57 and with the hand lever 63 in an upright position. In such position the bore 53 is aligned with and connects the inlet and outlet ports 23 and 31 directly and the pump may simply pump the fluid through the lines 14 and 30 back into the reservoir thus causing a recirculation of the fluid and preventing the pump from working against a pressure or head when not actually operating.

To supply fluid through the line 46 the lever 63 is swung to one side to the position shown in Fig. 5 which operation, by rotating the valve plunger 17, will bring the notch 54 therein into a position in which it will bridge the supply port 25 and outlet port 39, thus connecting the lines 14 and 46. The fluid pressure will of course unseat the check valve ball 74 at this time but relief of the pressure then present in both openings 37 and 38 will be prevented by the check valve ball 75. To supply fluid through the line 50 the lever 63 is swung in the opposite direction turning the valve plunger and now bringing the notch 55 into position for bridging the supply port 26 and outlet port 43 as seen in Fig. 4. The check valve ball 76 is now unseated by the fluid pressure and fluid flows through the lines 14 and 50 as required. As will be clearly evident the notches 54—55 are so located (on opposite sides of the plunger) that the pressure line 14 may not be connected to both lines 46 and 50 at the same time although pressure in one line may be held as pressure is admitted to the other.

Attention is directed to the fact that, as the plunger 17 is oscillated to bring either notch 54—55 into registry with the supply ports 25 and 26, the bore 53 maintains at least partial registry with the inlet and exhaust ports 23 and 31. In other words, these ports 23 and 31 are only completely closed off, or isolated from each other, as the fluid flow to the lines 46 and 50 approaches its maximum and hence the load to the pump is brought to bear in a gradual manner.

Figure 2:
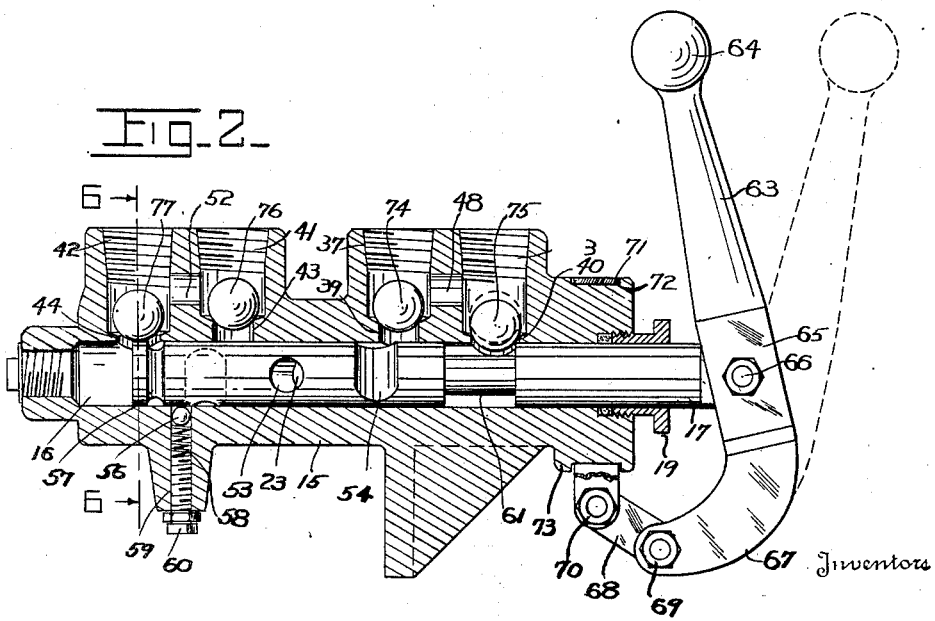
Fig. 2 is a similar view but showing the valve in one exhaust or pressure relieving position and with the handle or control lever position for another exhaust position of the valve indicated in dotted lines.

To relieve the pressure in the lines 46—50 and return the fluid to the reservoir the following operations are necessary. Assuming it is desired to return fluid from line 46, the hand lever 63 is pulled back or away from the valve to the position shown in dotted lines in Fig. 2 thereby moving the valve plunger 17 endwise and bringing the inner edge of the groove 61 into engagement with the check valve ball 75. Such engagement forces this ball upward unseating it and the fluid may then flow through the line 46, passage 48 and port 40 around the groove 61, through port 33 and duct 32 back into the return line 30 to the reservoir. Opposite movement of the lever 63 to the position shown in full lines in Fig. 2 will move the plunger 17 inward causing its end to engage and unseat the check valve ball 77 as shown. As this occurs fluid from the line 50 may flow through the passage 52, seat 44, port 34 and duct 32 into the return line to the reservoir. In both cases it will be noted (Fig. 2) that as the plunger moves inward or outward the bore 53 will retain at least partial registry with the ports 23 and 31 so that the pump may continue to recirculate the fluid without undue interference. For this purpose these ports 23 and 31 are elongated in the direction of the length of the plunger as will be evident.

The reciprocatory movements of the valve plunger as outlined above are limited by a stop screw 79 threaded in one side of the valve housing at 80 so that its inner end will enter the bore 16 and contact opposite ends of the groove 61.

It will be apparent from the foregoing that great flexibility of control may be had by manipulating the single hand lever in either of two planes toward or away from the valve or with a rotary motion with respect thereto. The movements are readily carried out to whatever degree required to accomplish the work and are so simple that little experience will be required for proper operation.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a valve, a housing having a bore arranged to receive fluid from a supply source and outlet and return ports opening into the bore intermediate the ends thereof, check valves in said ports, means movable in said bore in one direction for admitting fluid from the bore to said outlet port whereby the fluid will unseat and pass the check valve therein, said means being simultaneously movable in said bore in another direction for mechanically engaging the check valve in the return port laterally thereof to unseat the check valve to permit the return of the fluid therethrough into the bore.

2. In a valve, a housing having a bore connected with a source of fluid and having outlet and return ports communicating with said bore, a plunger movably mounted in the bore, a check valve in each port adapted when seated to prevent the flow of fluid through said ports into the bore, means operated by movement of the plunger in one direction for admitting fluid to the outlet port, and the check valve in the return port having a part extended into the bore for engagement and operation by the plunger as it moves in another direction to unseat the valve and permit the flow of fluid therethrough back into the bore.

3. In a valve, a housing having a bore arranged in connection with a source of fluid and having outlet and return ports communicating with said bore, a plunger movably mounted in the bore, a check valve in each port adapted when seated to prevent the flow of fluid through said ports into the bore, means operated by rotary movement of the plunger in the bore for admitting fluid to the outlet port, and means operated by endwise movement of the plunger for unseating the valve in the return port and permitting the return of fluid to the bore.

4. In a valve, a housing having a bore connected to a fluid source and having two spaced outlet ports and two spaced return ports communicating with the bore, a plunger rotatably and slidably mounted in the bore, a check valve in each of said ports and arranged to normally prevent the flow of fluid through the ports into the bore, means operated by rotary movement of the plunger for selectively connecting the fluid source to the outlet ports, means operated by endwise movement of the plunger in one direction for unseating the valve in one return port to permit return flow of the fluid into the bore, and means operated by endwise movement of the plunger in the opposite direction for unseating the valve in the other return port to permit fluid flow therethrough back to the bore.

5. In a valve, a housing having a bore arranged to receive fluid from a supply source and having an outlet port and a return port opening into the bore, a plunger movably mounted in the bore, a ball check valve in each port, means operated by movement of the plunger in one direction for admitting fluid from the bore to the outlet port to unseat and pass the check valve therein, and the ball of the check valve in the return port normally projecting into the bore in the housing to a position in the path of a portion of the plunger whereby movement of the plunger to engage said ball may unseat the same and permit the return flow of fluid into the bore.

6. A valve connected to receive fluid from a supply source and comprising a housing having a bore receiving fluid from said source, a plunger movably mounted in the bore, said housing also having an outlet port and a return port opening into the bore, said plunger being operable to admit fluid to the outlet port for passage therethrough, a check valve in the outlet port to prevent return flow of fluid to the bore, a check valve in the return port normally preventing fluid flow back to the bore, and said last mentioned valve including a member which, when seated, projects into the bore in position for engagement by endwise movement of the plunger for forcibly unseating the valve member and permitting flow of fluid through the return port.

7. A valve for connection to a fluid supply source comprising a housing having a bore adapted to receive fluid from said source, a plunger movably mounted in the bore, said housing also having a pair of spaced outlet ports and a pair of spaced return ports communicating with the bore, said plunger having means operative to selectively admit fluid to said outlet ports, check valves in the return ports adapted to normally prevent return flow or fluid therethrough into the bore, said check valves each including a ball so arranged that when seated it will project partially into the bore in the path of the plunger, one plunger end being positioned to engage and unseat one of said balls when the plunger is moved endwise in one direction, and the plunger having a groove normally clearing the other ball but having a margin adapted to engage and unseat said other ball when the plunger is moved endwise in an opposite direction.

8. A valve structure comprising a housing having a bore, a fluid pressure line and an exhaust line connected to the housing, said housing having ports connecting said lines with the bore, pressure outlet and return ports communicating with the bore, a plunger mounted for rotation and reciprocation in the bore, adapted upon rotation to connect the fluid pressure port to an outlet port and upon reciprocation to permit flow from a return port to the exhaust port, said plunger having a port normally registering with the said first mentioned ports in the housing to permit circulation of the fluid through the valve between the pressure and exhaust lines, and said first mentioned ports being so located that at least partial registration will be maintained as the plunger is moved to permit the return of fluid from a return port to the exhaust port.

9. In a valve, a housing having a bore adapted to receive fluid from a supply source and having outlet and return ports communicating with said bore and means to receive fluid from the bore for return to said source, a plunger movably mounted in the bore, a spring pressed check valve in each port adapted when seated to prevent the flow of fluid through said ports into the bore, said plunger having means for admitting fluid to the outlet port, and the check valve in the return port being adapted to normally project into the path of the plunger whereby endwise movement of the plunger will unseat said check valve to permit the return flow of fluid into the bore.

10. In a valve, a housing having inlet and exhaust openings between which fluid may circulate through the housing, said housing having a bore in communication with said inlet and exhaust, a plunger mounted for longitudinal and oscillatory movements in the bore and having openings for the passage of fluid, two pairs of ports in communication with the bore, each pair comprising an outlet and a return port, predetermined longitudinal movements of the plunger selectively connecting said inlet opening with said outlet ports, and means operable by predetermined oscillatory movements of the plunger for selectively permitting communication between said return ports and the exhaust opening, whereby movements of the plunger will be operative to provide fluid under pressure to either of said outlet ports and to control the return of such fluid to the housing.

JOSEPH F. SCHWAN.
CHARLES F. PIERSON.